(12) United States Patent
Li et al.

(10) Patent No.: US 12,058,411 B2
(45) Date of Patent: Aug. 6, 2024

(54) SECURE MONITORING OF SYSTEM-ON-CHIP APPLICATIONS

(71) Applicant: Avago Technologies International Sales Pte. Limited, Singapore (SG)

(72) Inventors: Yong Li, San Diego, CA (US); Qiang Ye, Tustin, CA (US); Xuemin Chen, Rancho Santa Fe, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 18 days.

(21) Appl. No.: 16/510,719

(22) Filed: Jul. 12, 2019

(65) Prior Publication Data

US 2020/0021885 A1 Jan. 16, 2020

Related U.S. Application Data

(60) Provisional application No. 62/697,948, filed on Jul. 13, 2018.

(51) Int. Cl.
*H04N 21/442* (2011.01)
*H04N 21/25* (2011.01)
*H04N 21/6547* (2011.01)

(52) U.S. Cl.
CPC ..... *H04N 21/44204* (2013.01); *H04N 21/251* (2013.01); *H04N 21/4424* (2013.01); *H04N 21/6547* (2013.01)

(58) Field of Classification Search
CPC ........... H04N 21/44204; H04N 21/251; H04N 21/4424; H04N 21/6547

USPC ......................................................... 725/14
See application file for complete search history.

(56) References Cited

U.S. PATENT DOCUMENTS

| | | | |
|---|---|---|---|
| 7,155,514 B1 * | 12/2006 | Milford | H04L 41/06 709/225 |
| 7,620,057 B1 * | 11/2009 | Aloni | G06F 12/0804 370/395.7 |
| 10,375,020 B2 * | 8/2019 | Wing | H04L 63/20 |
| 10,733,005 B1 * | 8/2020 | Zelenov | G06F 9/452 |
| 2009/0038010 A1 * | 2/2009 | Ma | G06F 11/3672 726/23 |
| 2012/0124184 A1 * | 5/2012 | Sakata | H04L 67/568 709/220 |
| 2013/0086203 A1 * | 4/2013 | Avner | G06F 11/3495 709/217 |
| 2014/0232863 A1 * | 8/2014 | Paliga | H04N 21/278 348/143 |
| 2015/0142947 A1 * | 5/2015 | Dyba | H04L 41/0853 709/224 |
| 2016/0065635 A1 * | 3/2016 | Besehanic | H04N 21/4667 709/224 |
| 2017/0006318 A1 * | 1/2017 | Jennings | G06Q 30/0251 |

(Continued)

*Primary Examiner* — Jefferey F Harold
*Assistant Examiner* — Franklin S Andramuno (57) ABSTRACT

A data analytics device for application monitoring includes an application-monitor manager engine to receive configuration files from a cloud server and to generate monitoring rules for a number of monitors. A data-processing engine is coupled to the application-monitor manager engine and the monitors and coordinates activities of the plurality of monitors. The monitors are embedded in a user space and a kernel of a host operating system, and the monitoring rules for the monitors are generated based on the configuration files.

9 Claims, 9 Drawing Sheets

(56) References Cited

U.S. PATENT DOCUMENTS

| | | | | |
|---|---|---|---|---|
| 2017/0316185 A1* | 11/2017 | Park | ................ | H04L 63/102 |
| 2018/0255100 A1* | 9/2018 | Degioanni | ............ | G06F 21/52 |
| 2018/0324063 A1* | 11/2018 | Oliveira | ............... | H04L 43/065 |
| 2019/0199755 A1* | 6/2019 | Larionov | ............... | H04L 67/10 |

* cited by examiner

SECURE MONITORING OF SYSTEM-ON-CHIP APPLICATIONS

CROSS-REFERENCE TO RELATED APPLICATIONS

This application claims the benefit of priority under 35 U.S.C. § 119 from U.S. Provisional Patent Application 62/697,948 filed Jul. 13, 2018, which is incorporated herein by reference in its entirety.

TECHNICAL FIELD

The present description relates in general to video processing, more particularly, for example, without limitation, to secure monitoring of system-on-chip applications.

BACKGROUND

Data-analytic monitoring can be used to measure the application performance and traffic behavior of a network. The data-analytic monitoring includes monitoring and management of operator devices such as set-top box and cable-modem devices connected to a network. The data-analytic monitoring may include collecting data of the operator devices, mining of the collected data and aggregating data for use by various network applications. The network applications may enable user interaction to query, view and interface with a data-analytic repository.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to the monitoring and management of operator devices such as set-top boxes (STBs) and cable modems (CMs). The disclosed monitoring and management are based on the data analytics of the operator devices and the mining of data collected from these devices. The subject technology provides solutions for detection and mitigation of field issues and malicious intrusion associated with the operator devices. The disclosed technology supports datasets that have characteristics of big data such as high-volume, high-velocity (e.g., real-time), large-variety (e.g., related to multiple media types, multiple interfaces, and multiple system components), and possibly semi-structured and/or unstructured data. The subject solutions can be procedural or statistical in nature, and, more particularly, they can be based on deep-learning mechanisms. For security-related monitoring applications (e.g., intrusion detection), the data collection and processing can be carried out in the trusted execution environment. Analytic parameters (small data) are collected from networking and audio-video (AV) functional blocks and interfaces via corresponding host software (SW) drivers and porting interfaces (PIs). The collection of analytic parameters can be done periodically or be event-driven. The analytic data (big data) is securely processed and logged in the system-on-chip (SoC) by a host processor. The analytic data can be sent to the cloud via a cloud interface for further processing and storage.

Figure 1:
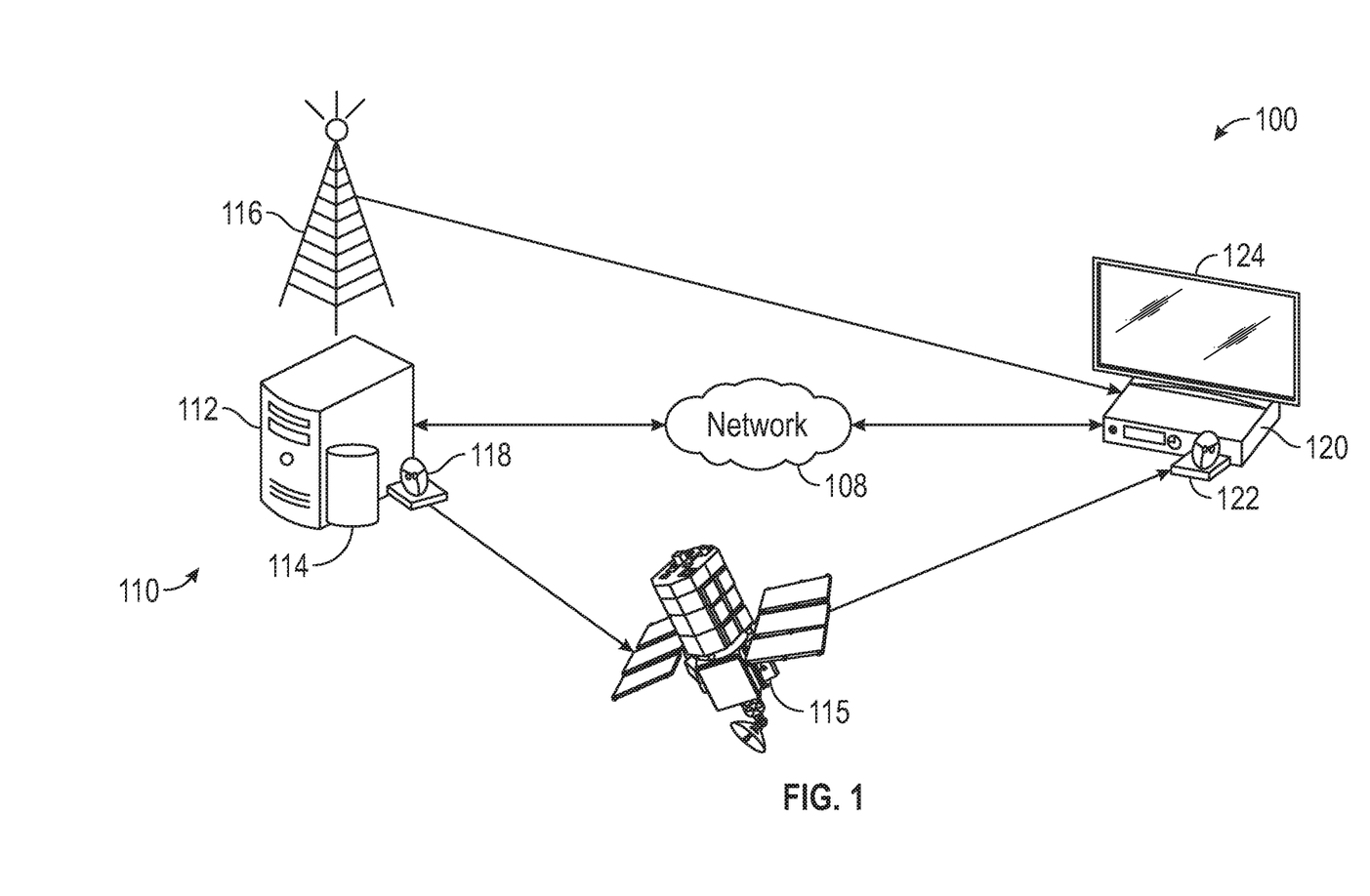
FIG. 1 illustrates an example of a network environment in which a secure monitoring system of the subject technology is used.

FIG. 1 illustrates an example of a network environment 100 in which a secure monitoring system of the subject technology is used. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The example network environment 100 includes a content-delivery network (CDN) 110 that is communicably coupled to an electronic device 120, such as by a network 108. The CDN 110 may include, and/or may be communicably coupled to, a content server 112 for encoding and/or transmitting encoded data streams, such as HEVC (high-efficiency video coding)/H.265 encoded video streams, AOMedia Video 1 (AV1) encoded video streams, and/or versatile video coding (VVC)/H.266 encoded video streams, over the network 108, an antenna 116 for transmitting encoded data streams over the air, and a satellite transmitting device 118 for transmitting encoded data streams to a satellite 115.

The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as encoded video streams, over the air from the antenna 116 of the CDN 110. The content server 112 and/or the electronic device 120 may be, or may include, one or more components of the electronic system discussed below with respect to FIG. 10.

The network 108 may be a public communication network such as the Internet, cellular data network or dial up modems over a telephone network, or a private communications network such as private local-area network (LAN) or leased lines. The network 108 may also include, but is not limited to, any one or more of the following network topologies: a bus network, a star network, a ring network, a mesh network, a star-bus network, a tree or hierarchical network, and the like. In one or more implementations, the network 108 may include transmission lines, such as coaxial transmission lines, fiber-optic transmission lines, or generally any transmission lines, that communicatively couple the content server 112 and the electronic device 120.

The content server 112 may include, or may be coupled to, one or more processing devices, a data store 114, and/or an encoder. The one or more processing devices execute computer instructions stored in the data store 114, for example, to implement a content-delivery network. The data store 114 may store the computer instructions on a nontransitory computer-readable medium. The data store 114 may further store one or more programs, e.g., video and/or audio streams, that are delivered by the CDN 110. The encoder may use a codec to encode video streams, such as an HEVC/H.265 codec, an AV1 codec, a VVC/H.266 codec, or any other suitable codec. In one or more implementations, the encoder may encode a video stream using block-size dependent filter selection for motion compensation, and/or using shorter interpolation filters for small blocks, which may largely reduce the memory bandwidth usage with minimum quality impact. In one or more implementations, the horizontal and vertical interpolation can have different filter lengths, the current block and overlapped areas can have different filter lengths, and the reference block may have a different size than the current block.

In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, such as an adaptive bit rate (ABR) server, that may be collocated with the content server 112 or may be disparately located from the content server 112.

The electronic device 120 may include, or may be coupled to, one or more processing devices, a memory, and/or a decoder, such as a hardware (HW) decoder. The electronic device 120 may be any device that is capable of decoding an encoded data stream, such as an encoded video stream.

In one or more implementations, the electronic device 120 may be, or may include all or part of, a laptop or desktop computer, a smartphone, a tablet device, a wearable electronic device, such as a pair of glasses or a watch with one or more processors coupled thereto and/or embedded therein, an STB, a television or other display with one or more processors coupled thereto and/or embedded therein, or other appropriate electronic devices that can be used to decode an encoded data stream, such as an encoded video stream.

In FIG. 1, the electronic device 120 is depicted as an STB, e.g., a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, the network 108, and/or the satellite 115, and decode the encoded data streams, e.g., using the HW decoder.

In one or more implementations, the network environment 100 includes an analytic device, analytics device protocols, an analytic portal, and user protocols. The electronic device 120 is, or includes at least a portion of the analytic device. The content server 112 may be, or may include at least a portion of the analytic portal. Alternatively, the content server 112 may be a device separated from the analytic portal. In some implementations, the analytics device can be configured for SoC data collection, caching, compression, protection and analytics processing, as described in more detail herein.

Figure 2:
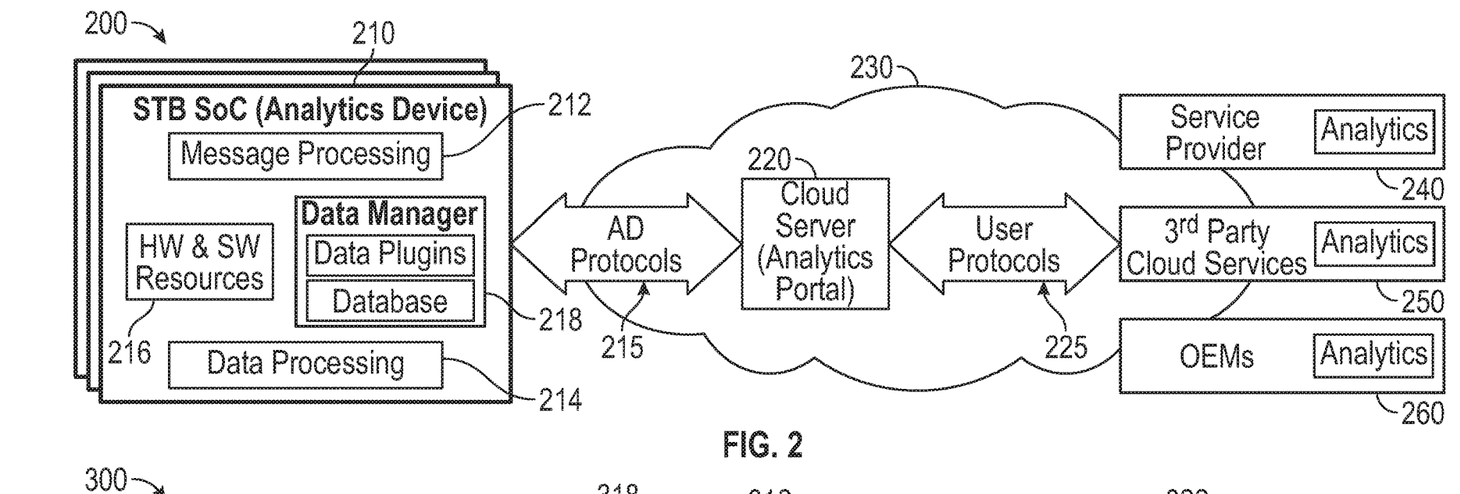
FIG. 2 illustrates an example of a system for collecting, transmitting and analyzing system-on-chip data, in accordance with one or more implementations of the subject technology.

FIG. 2 illustrates an example of a system 200 for collecting, transmitting and analyzing SoC data, in accordance with one or more implementations of the subject technology. The system 200 includes an analytics device (AD) 210, an analytics portal 220, one or more service providers 240, one or more third-party cloud services 250 and original equipment manufacturers (OEMs) 260. In some implementations, the analytics device 210 is an SoC and includes a message-processing unit 212, a data-processing unit 214, a HW and/or SW resource unit 216 and a data manager 218. The analytics device 210 can be configured for SoC data collection, caching, compression, protection and analytics processing. The analytics device 210 can proactively monitor the services delivered by STBs (e.g., cable modems) on an operator network, and remotely detect and isolate failures of STBs as discussed herein. The message-processing unit 212, the data-processing unit 214 and the data manager 218 may be implemented in HW, firmware (FW), SW or a combination of HW, FW and/or SW.

In some implementations, the analytics device 210 can monitor central-processing unit (CPU)-initiated active and background applications by using an operating system (OS) (e.g., Android or Linux) application manager. The analytics device 210 can also monitor internet-protocol (IP) session events and dynamic analytic data by using the IP stack in the OS. The monitoring may not need to rely on cooperation with the video applications. The analytics device 210 can further monitor the video and security events and dynamic analytic data by using SoC video and security engines. The analytics device 210 can send the collected events and analytic data to a cloud-based network including a cloud-based processor. The events and analytic data are securely packaged for confidentiality, authentication and nonrepudiation by an AD protocol 215.

The analytics portal 220 is a cloud-based data-analytics portal that is implemented over the cloud 230 and can communicate with the analytics device 210 via the analytics device protocols 215, and with the one or more service providers 240, the one or more third-party cloud services 250 and the OEMs 260 via user protocols 225. The analytics portal 220 can be configured to support data-analytic system configuration, data conversion, storage, protocol proxy, application processing and also certain data analytics processing. The analytics portal 220 can diagnose and analyze by aggregating diagnostics data across many areas to detect and identify root causes for a wide range of customer and network issues. The analytics portal 220 can also diagnose and analyze by enabling complex cross-domain analysis with machine learning using comprehensive data sets collected from a number of SoC platforms including SoC devices (e.g., analytics device 210). The analytics device protocols 215 include standards-based protocols for data transmission between SoC devices and the cloud-based analytics portal 220. The analytics device protocols 215 have a consolidation role and provide standards-based protocols and interfaces for proactive notifications, database queries and device operation analysis. The user protocols 225 are data-analytic system user protocols that include standards-based protocols for delivering data and analytics results to the one or more service providers 240, the one or more third-party cloud services 250 and the OEMs 260. The subject technology also includes third-party applications that can predict and/or act by mitigating the risks of various devices and network failures. The third-party applications can analyze the IP session, video, security events and/or dynamic analytic data by performing deep packet inspection (DPI) and correlation in timeline and traffic patterns.

Figure 3:
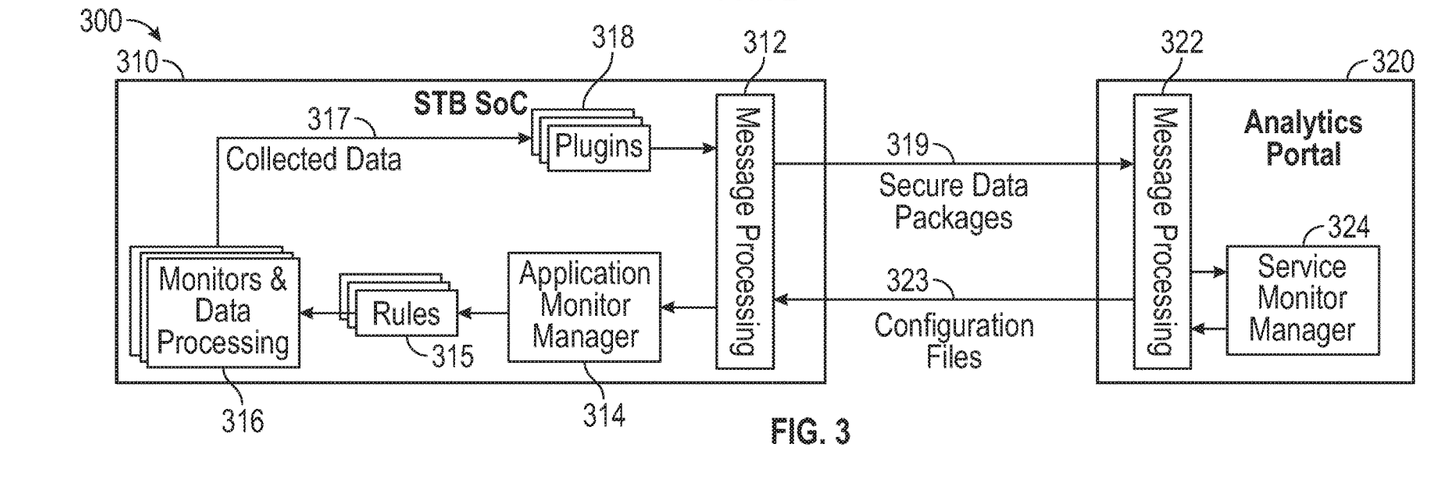
FIG. 3 illustrates an example of a data analytics system for a video-application monitoring process, in accordance with one or more implementations of the subject technology.

FIG. 3 illustrates an example of a data analytics system 300 for a video-application monitoring process, in accordance with one or more implementations of the subject technology. The data analytics system 300 includes a STB SoC 310 and an analytics portal 320. Note that such STB SoC may be a SoC for an over-the-top (OTT) STB. In some implementations, the STB SoC 310 is an implementation of the analytics device 210 of FIG. 2. The STB SoC 310 includes a message-processing unit 312, an application-monitor manager engine 314, a monitors and data-processing engine 316 and plugins 318. The analytics portal 320 is a cloud-based portal and includes a message-processing unit 322 and a service-monitor manager engine 324. The service-monitor manager engine 324 specifies data-analytics device-monitoring rules in one or more configuration files 323, which are securely provided via the message-processing unit 322 to the message-processing unit 312 of the STB SoC 310.

The message-processing unit 312 is responsible for receiving the configuration files 323 from the analytics portal 320 and processing them to adapt to format requirements of the application-monitor manager engine 314. The application-monitor manager engine 314 sets up and enforces the monitoring rules 315 for various monitors according to the configuration file. The monitoring rules 315 may include rules that require the monitors to take actions on certain applications. In some implementations, one or more monitors of the monitors and data-processing engine 316 can be embedded in the user space and a kernel of a host CPU OS as well as a video engine and a security engine of the host. In some implementations, the video engine monitors can monitor video content analytics data and security engine monitors can monitor security analytics data. The video content analytics data includes a manifest file, a video content source, a video segment identification and video segment statistics. The security analytics data include traffic pattern information, digital rights management (DRM) attributes and encryption- and/or authentication-key information.

The monitors and data-processing engine 316 can pre-process the collected data from monitors and detect relevant events, for example, the start and/or completion of an active and/or background application, a domain-name system (DNS) query, a video-streaming session, or other operations. The monitors and data-processing engine 316 is also responsible for coordinating activities of all functional monitors, for example, triggering a monitoring of the hyper-text transfer protocol (HTTP) messages with the resolved IP address as the source and/or destination IP address upon the completion of a DNS query.

The plugins 318 securely package the collected and preprocessed data from the monitors and data-processing engine 316. The secure data packages 319 are then handed over to the message-processing unit 312 for sending to analytics portal 320. The secure data packages 319 are encrypted and hash-based message authentication code (HMAC)-protected using shared keys with the analytics portal 320 for data confidentiality, authentication and non-repudiation. In some aspects, a time code and SoC identification (ID) are included in the data package to uniquely tie it with a given SoC and a time code. The secure data packages 319 are sent to the cloud-based network (e.g., the service-monitor manager engine 324 in the analytics portal 320) via a secure transport protocol such as the hypertext-transfer protocol secure (HTTPS). The transmission of the secure data packages 319 can be an on-demand (pull mode) or a scheduled (push mode) transmission.

The data analytics system 300 can use the collected data for postmortem forensics. The video session information (e.g., manifest files) and video traffic pattern can be used to identify the specific video program by correlating the information with the corresponding information of the video-program library generated offline (e.g., via machine-learning classification such as a machine-learning-based model).

Figure 4:
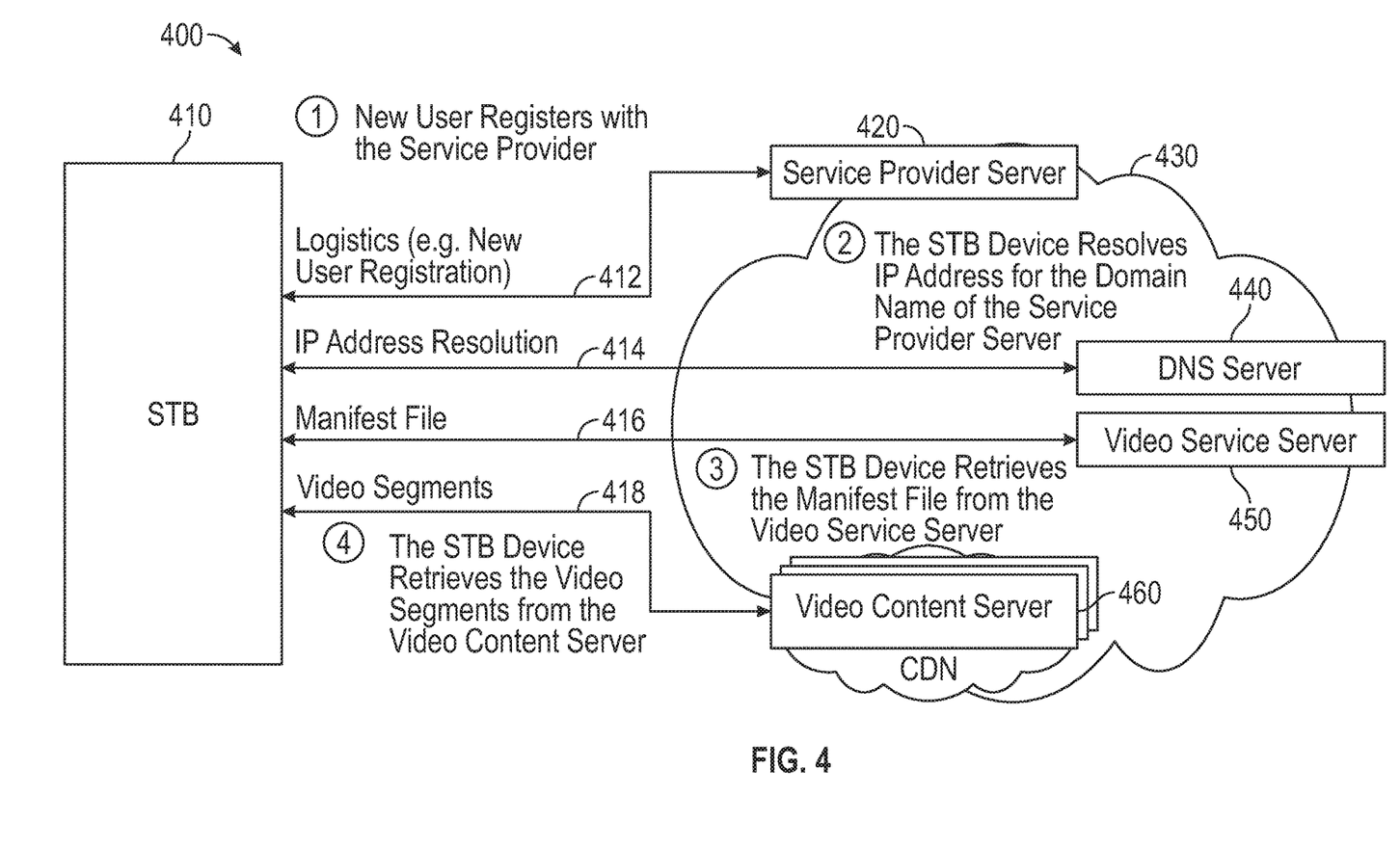
FIG. 4 illustrates an example of a secure video-monitoring process of an over-the-top device accessing video streaming services, in accordance with one or more implementations of the subject technology.

FIG. 4 illustrates an example of a secure video-monitoring process 400 of a STB device 410 accessing video-streaming services, in accordance with one or more implementations of the subject technology. The secure video-monitoring process 400 enables the STB device 410 to access video-streaming services of a cloud-based CDN over the cloud 430. The cloud-based CDN includes a service provider server 420, a DNS server 440, a video service server 450 and one or more video content server 460. The secure video-monitoring process 400 starts with a new user registering with the service provider server 420. The new user registers a domain name, which is provided along with other logistics 412 to the STB device 410 by the service provider server 420. The STB device 410 resolves an IP address 414 associated with the registered domain name and provides the IP address 414 to the DNS server 440. Next, the STB device 410 retrieves a manifest file 416 from the video service server 450. The manifest file 416 is a file describing which video segments are available on a video content server 460. Finally, the STB device 410 retrieves the video segments 418 from the video content server 460. The secure video-monitoring of the subject technology focuses on the events and data generated during steps of resolving IP address 414, retrieving the manifest file 416 and the video segments 418, as described herein.

Figure 5:
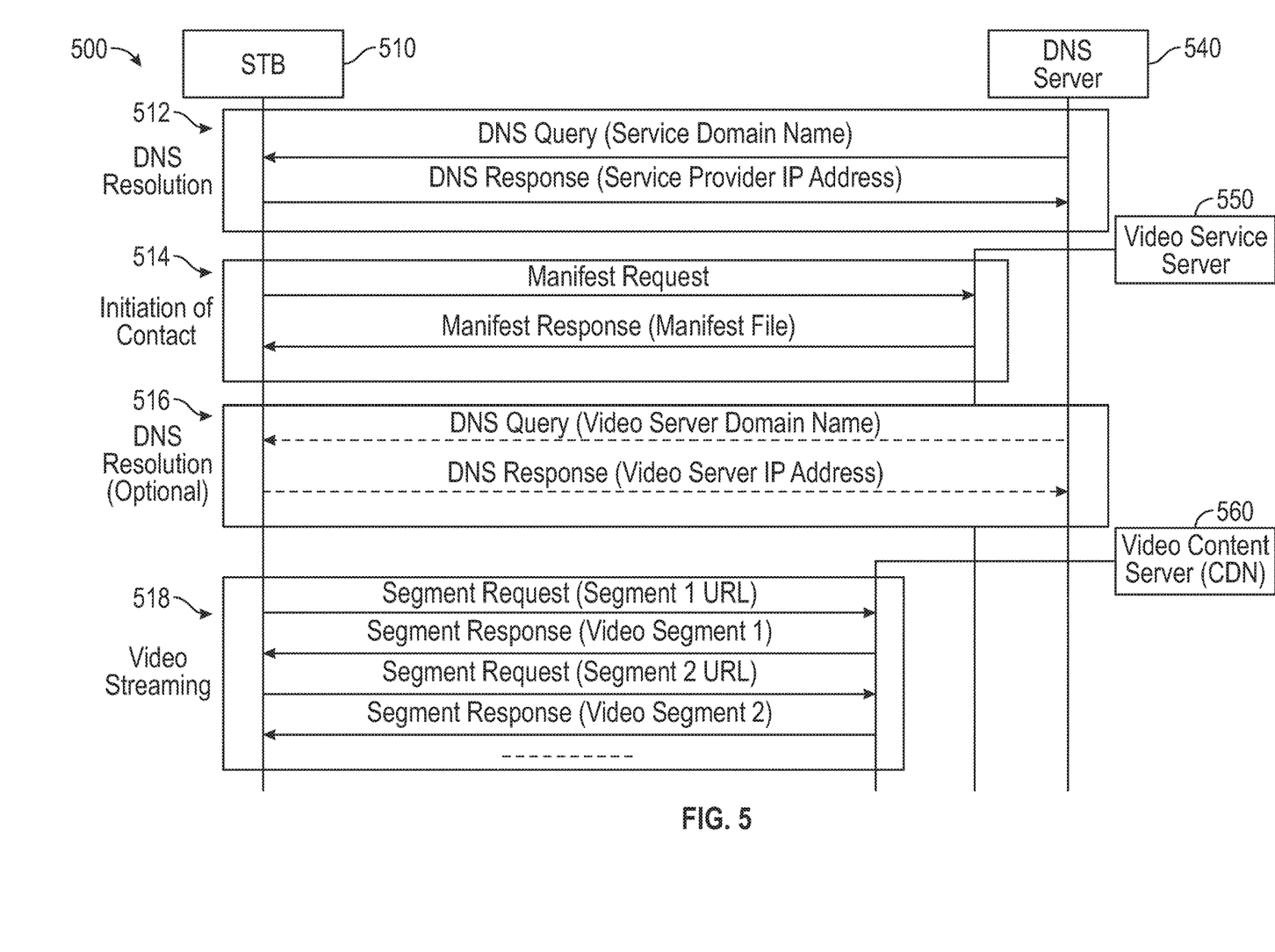
FIG. 5 illustrates an example of an interne protocol stack monitoring process, in accordance with one or more implementations of the subject technology.

FIG. 5 illustrates an example of an IP stack-monitoring process 500, in accordance with one or more implementations of the subject technology. The IP stack-monitoring process 500 is an example of a secure monitoring process of the subject technology as focused in resolving IP address, retrieving a manifest file and the video segments. The IP stack-monitoring process 500 performs IP stack monitoring by extracting information from a DNS server 5, a manifest file and video segments requests, as described herein.

The STB device 510, the DNS server 540, the video service server 550 and the video content server 560 are similar to the STB device 410, the DNS server 440, the video service server 450 and the video content server 460 of FIG. 4. The IP stack monitoring process 500 takes place in a number steps including a DNS resolution step 512, a contact initiation step 514, a DNS resolution step 516 (optional) and a video streaming step 518.

In the DNS resolution step 512, the DNS server 540 sends a DNS query including a service domain name of a registered user to the STB device 510 and, in response to the query, the STB device 510 provides a DNS response including a resolved IP address associated with the service domain name in the DNS query. In the contact-initiation step 514, the STB device 510 sends a manifest request to the video-service server 550, and in response, the video-service server 550 provides a manifest file to the STB device 510. In the optional DNS resolution step 516, a DNS query including a video-server domain name is issued by the DNS server 540, and in response, the STB device 510 provides a video-server IP address associated with the video-server domain name. Finally, in the video-streaming step 518, the STB device 510 sequentially sends multiple segment requests using different video-segment uniform resource locators (URLs) (e.g., segment 1 URL, segment 2 URL and so on) to the video-content server 560, and in response, receives corresponding video segments (e.g., video segment 1, video segment 2 and so on).

The IP stack-monitoring process 500 allows monitoring user activities to identify, for example, the source of video content from which the video stream is downloaded, and intercepting and possibly obtaining the manifest file, to find out the nature of the content the user is streaming. This allows ensuring that the source of the video content and the video content itself are legal and do not involve security issues.

Figure 6:
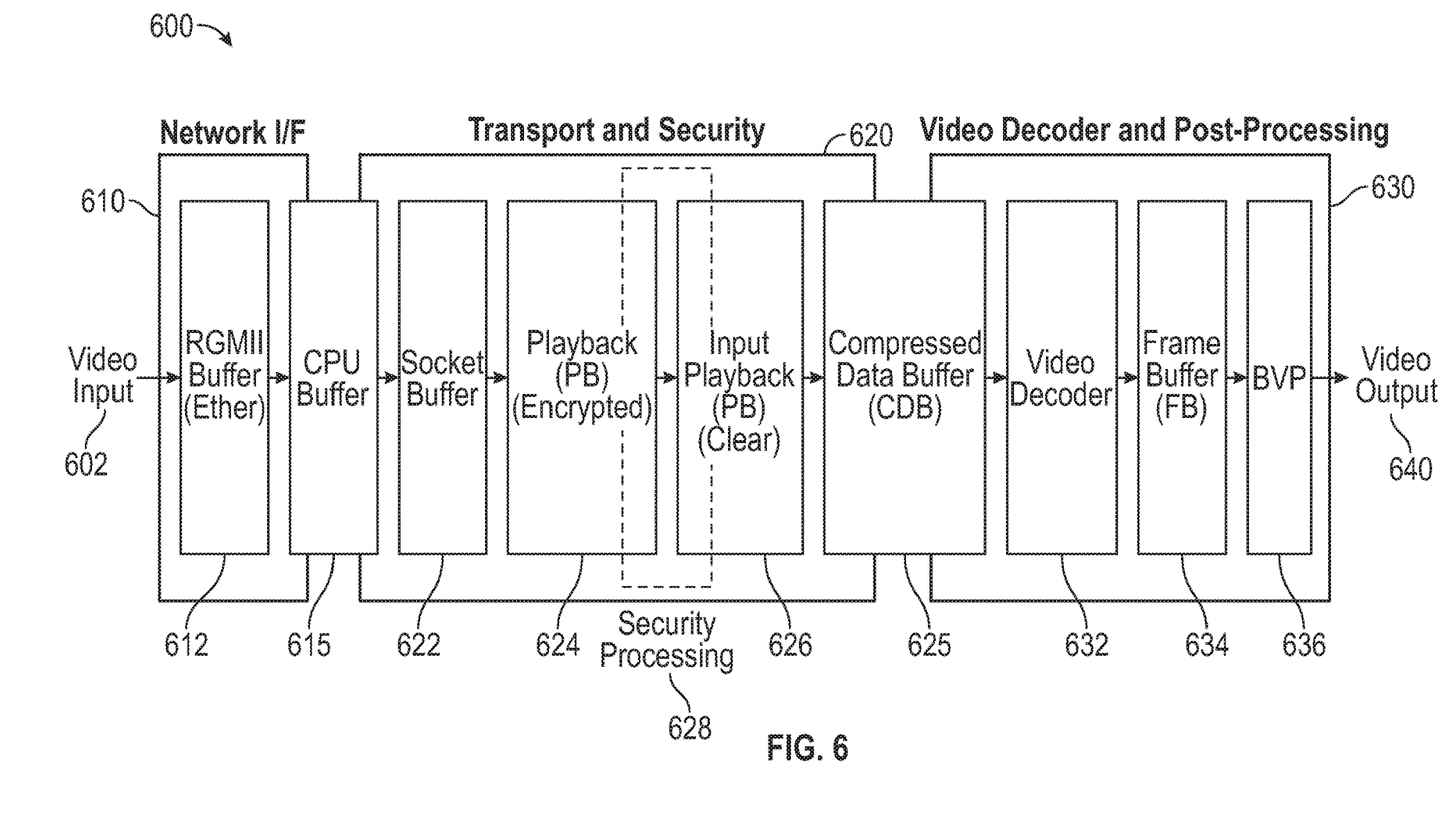
FIG. 6 illustrates an example of a monitoring process of video and security engines, in accordance with one or more implementations of the subject technology.

FIG. 6 illustrates an example of a SoC video processing dataflow, in which a monitoring process 600 being applied to video and security engines, in accordance with one or more implementations of the subject technology. The monitoring process 600 includes a number of data analytics groups including network analytics, transport and security analytics and video-decoder and post-processing analytics data that are collected at various stages, including a network-interface stage 610, a transport and security stage 620 and a video decoder and post-processing stage 630. The network interface stage 610 may include a Wi-Fi or an Ethernet interface that receives a video input 602 and enters it into a user interface such as a reduced gigabit media-independent interface (RGMI) buffer 612, from which the video input 602 is delivered to CPU buffer 615. The network analytics is collected in the network interface stage 610 and includes, for example, an input interface identification (ID), a 5-tuple session ID including source and destination IP addresses, source and destination port numbers and a protocol ID.

In the transport and security stage 620, the video data is moved to a socket buffer 622, from which the video data is retrieved for decryption by a playback block 624 and security processing by, for example, a security processor 628. The decrypted video data is moved to an input playback block 626 and from which to a compressed data buffer (CDB) 625. The transport and security analytics data is collected in the transport and security stage 620 and includes security analytics data consisting of traffic pattern information such as periodic byte counts of stream content, DRM attributes and encryption- and/or authentication-key information.

In the video decoder and post-processing stage 630, a video decoder 632 decodes the decrypted video data and provides the decrypted video data frames to a frame buffer (FB) 634 (e.g., random-access memory (RAM)), from which the decoded frames are retrieved for post-processing by the broadband video-processor (BVP) block 636 that prepares a video output 640 for displaying on a display device (e.g., a television set, a monitor).

The video decoder and post-processing analytics data are collected during the video decoder and post-processing stage 630 and include parameters such as codecs, video format and frame rate, decoder statistics and output interface ID.

Figure 7:
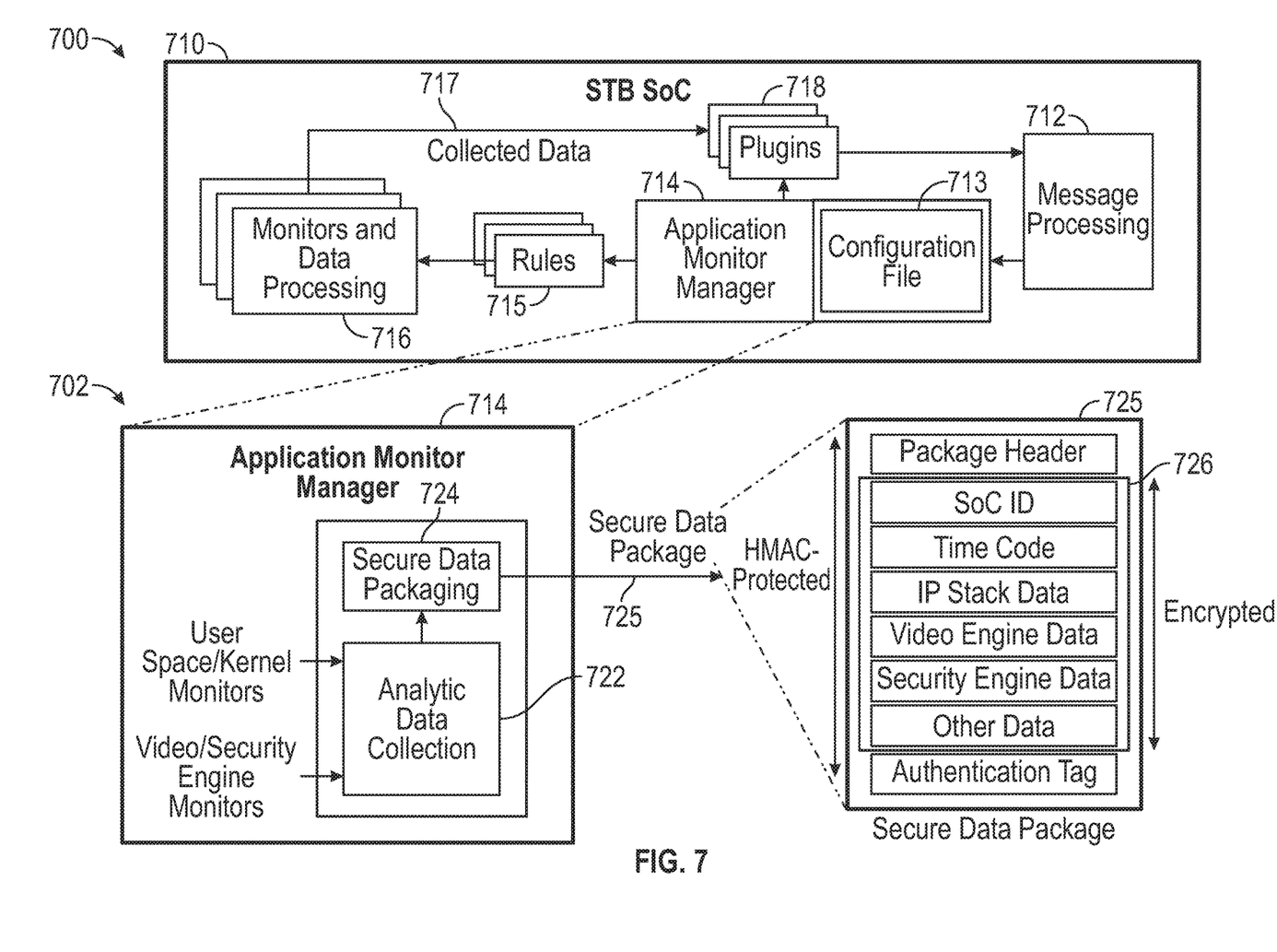
FIG. 7 illustrates an example of a security-monitoring scheme for data transportation to the cloud, in accordance with one or more implementations of the subject technology.

FIG. 7 illustrates an example of a security-monitoring scheme 700 for data transportation to the cloud, in accordance with one or more implementations of the subject technology. The security-monitoring scheme 700 is implemented by a STB SoC 710 including a message-processing unit 712, an application monitor manager engine 714, a monitors and data processing engine 716 and plugins 718, which are respectively similar to the message-processing unit 312, the application-monitor manager engine 314, a monitors and data-processing engine 316 and plugins 318 of FIG. 3. As discussed above with respect to FIG. 3, the application monitor manager engine 714 receives configuration files 713 from the message-processing unit 712 and generates rules 715 for the monitors and data processing engine 716. The focus of the security-monitoring scheme 700 is on the application monitor manager engine 714, which, as shown in an expanded view 702, includes an analytic data collection unit 722 and a secure data packaging unit 724. The analytic data collection unit 722 collects a number of monitors, for example, user-space and/or kernel monitors and video-security engine monitors and provides data to the secure-data packaging unit 724. The secure-data packaging unit 724 prepares a secure-data package 725. The secure data package 725 includes an encrypted portion 726 consisting of an SoC ID, a time code, IP stack data, video engine data, security engine data and other data that is packaged with a package header and an authentication tag. The secure data package 725 is further HMAC-protected using shared keys with the cloud for data confidentiality, authentication and nonrepudiation. The time code and SoC ID are added to the package to uniquely tie the package with a given SoC and a time code. The secure data package 725 is delivered to the plugins 718 to be transmitted to the cloud, via a secure transport protocol (e.g., HTTPS), for processing by a service-monitor engine manager (e.g., 324 of FIG. 3) of an analytics portal (e.g., 320 of FIG. 3). The transmission can be either on-demand (pull) or scheduled (push) transmission.

Figure 8:
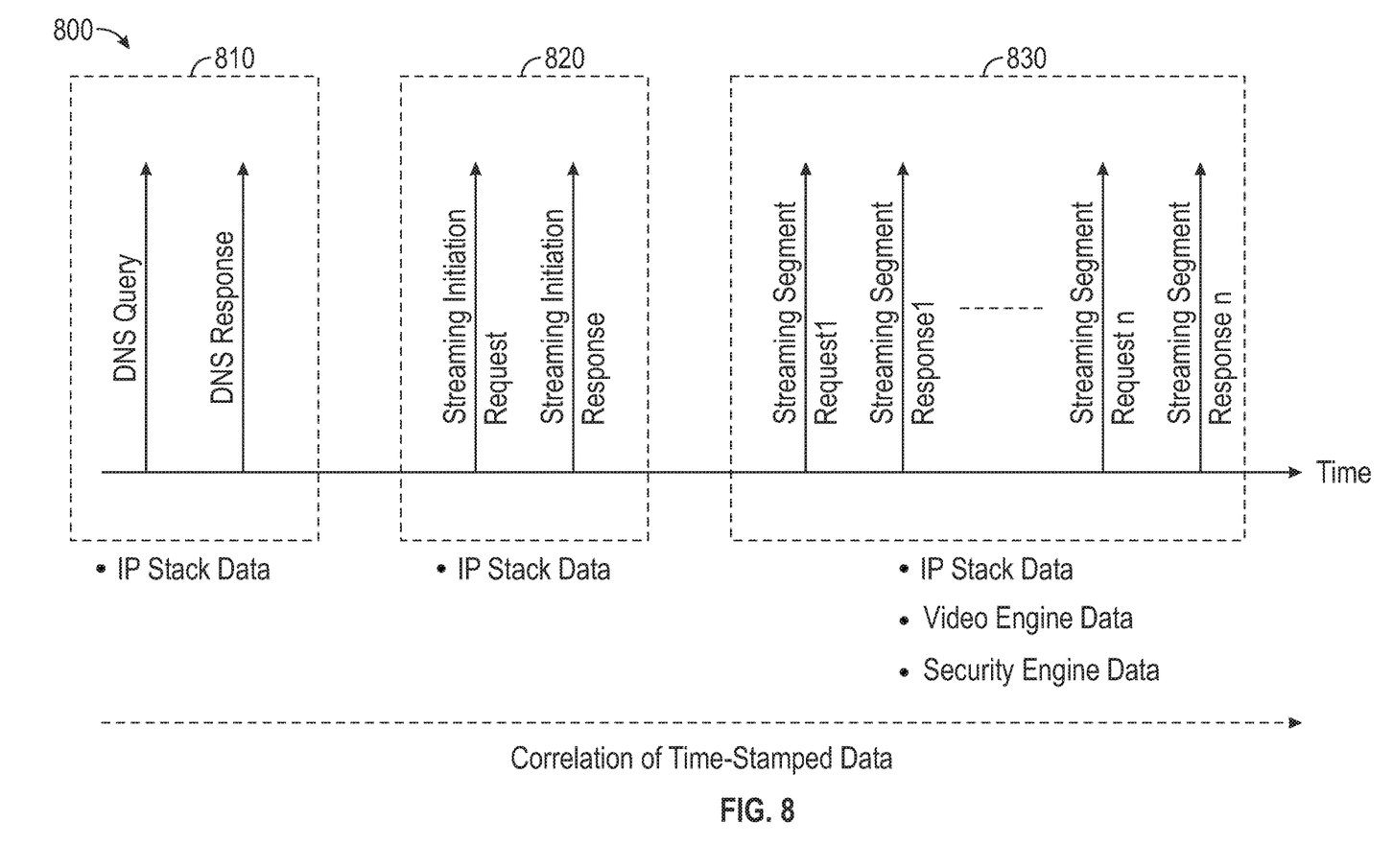
FIG. 8 illustrates an example of a timeline of an analysis of collected data in the cloud, in accordance with one or more implementations of the subject technology.

FIG. 8 illustrates an example of a timeline 800 of an analysis of collected data in the cloud, in accordance with one or more implementations of the subject technology. The subject technology includes third-party applications that can predict and/or act by mitigating the risks of various devices and network failures. The third-party applications can analyze the IP session, video, security events and/or dynamic analytic data by performing DPI and correlation in timeline and traffic patterns. The timeline 800 depicts a correlation of time-stamped data collection sequence of data including IP stack data 810 and 820 and IP stack plus video-engine and security-engine data 830. The IP stack data 810 includes a DNS query and a DNS response. The IP stack data 820 includes a streaming initiation request and a streaming initiation response. The IP stack plus video-engine and security-engine data 830 includes a sequence of a number of streaming segment requests (e.g., streaming segment request 1, streaming segment request 2 . . . streaming segment request n) and corresponding streaming segment responses (e.g., streaming segment response 1, streaming segment response 2 . . . streaming segment response n). The collected data can then be used for postmortem forensics. The video-session information (e.g., the manifest file) and video-traffic pattern can be used to identify a specific video program by correlating the information with the corresponding information of the video program library generated offline (e.g., via a machine-learning classification algorithm).

Figure 9:
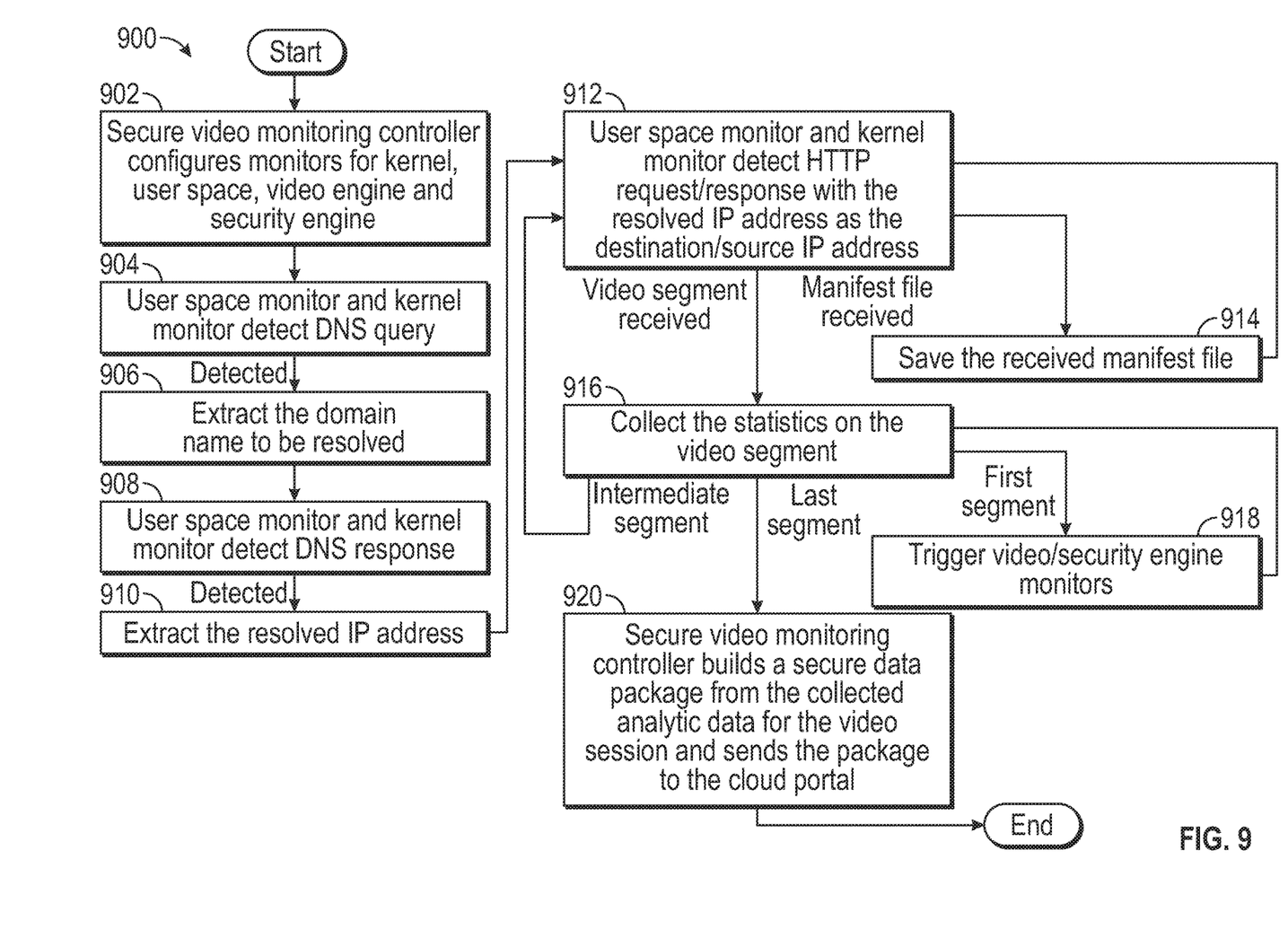
FIG. 9 illustrates a high-level flow diagram of an example data-collection algorithm in an analytics device, in accordance with one or more implementations of the subject technology.

FIG. 9 illustrates a high-level flow diagram of an example data-collection algorithm 900 in an analytics device, in accordance with one or more implementations of the subject technology. The example data-collection algorithm 900 can be implemented by an analytics device (e.g., 210 of FIG. 2 or 310 of FIG. 3). The example data-collection algorithm 900 starts at operation block 902, where a secure video-monitoring controller configures monitors (e.g., monitors of monitors and data-processing engine 316 of FIG. 3) for kernel, user space, video engine and security engine processing. At operation block 904, a user-space monitor and kernel monitors can detect a DNS query. At operation block 906, the domain name to be resolved is extracted from a DNS server (e.g., 540 of FIG. 5). At operation block 908, the user-space monitor and kernel monitors detect a DNS response from a STB device (e.g., 510 of FIG. 5). Based on the detection, at operation block 910, the resolved IP address is extracted.

At operation block 912, the user-space monitors and kernel monitors detect HTTP requests and/or responses with the resolved IP address as the destination and/or source IP address of a video service server (e.g., 550 of FIG. 5) and a video content server (e.g., 560 of FIG. 5) to receive a manifest file and video segments. The received manifest file is saved, at operation block 914, and the control is passed to the operation block 912. The received video segments are used to collect, at operation block 916, the statistics on the video segments. The statistics on the first segment are passed to the operation block 918, where video/security engine monitors (e.g., 316 of FIG. 3) are triggered and the control is passed to operation block 916 to collect further statistics on the following video segments. The collected statistics on intermediate segments are then passed to the operation block 912 to receive respective video segments. Finally, the statistics on the last segment is passed to the operation block 920, where the secure video-monitoring controller builds a secure data package from the collected analytic data for the video session and transmits the package to the cloud portal (e.g., the analytics portal 220 of FIG. 2).

Figure 10:
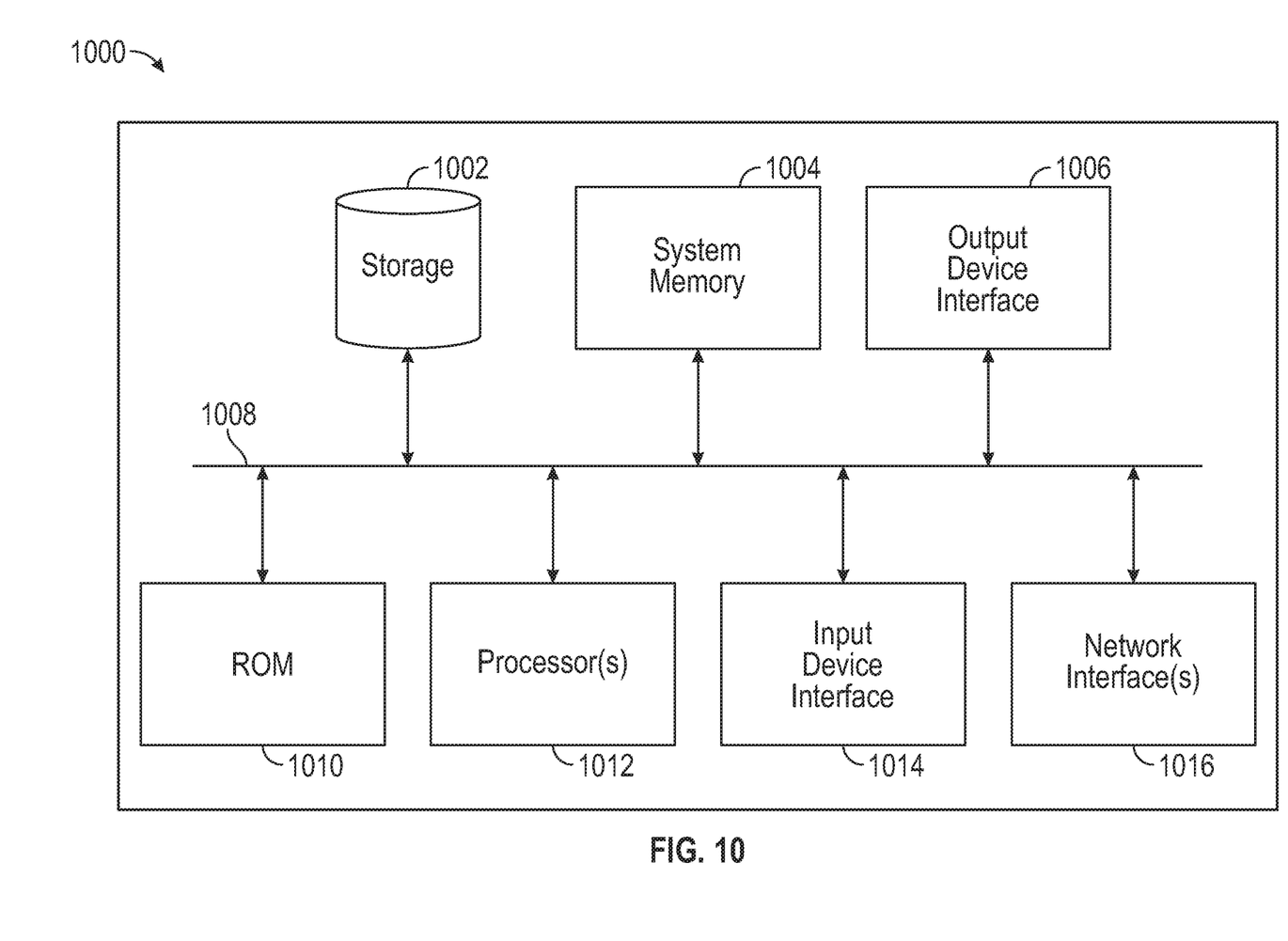
FIG. 10 conceptually illustrates an electronic system with which aspects of the subject technology are implemented.

FIG. 10 conceptually illustrates an electronic system 1000 with which aspects of the subject technology are implemented. The electronic system 1000, for example, can be a network device, a STB device, a media converter, a desktop computer, a laptop computer, a tablet computer, a server, a switch, a router, a base station, a receiver, a phone, or generally any electronic device that transmits signals over a network. Such an electronic system 1000 includes various types of computer-readable media and interfaces for various other types of computer-readable media. In one or more implementations, the electronic system 1000 is, or includes, one or more of the devices 112 or 120 of FIG. 1 or may perform some of the functionalities of the analytics device (e.g., 210 of FIG. 2) of the subject technology. The electronic system 1000 includes a bus 1008, one or more processing units 1012, a system memory 1004, a read-only memory (ROM) 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing units 1012 with the ROM 1010, the system memory 1004, and the permanent storage device 1002. From these various memory units, the one or more processing units 1012 retrieve instructions to execute and data to process in order to execute the processes of the subject disclosure. The one or more processing units 1012 can be a single processor or a multi-core processor in different implementations. In one or more implementations, one or more processing units 1012 are, or include, one or more of the devices 112 or 120 of FIG. 1 or may perform some of the processing functionalities of the analytics devices of subject technology, such as security monitoring, message processing, analytics processing, video decoding, and video post-processing.

The ROM 1010 stores static data and instructions that are needed by the one or more processing units 1012 and other modules of the electronic system. The permanent storage device 1002, on the other hand, is a read-and-write memory device. The permanent storage device 1002 is a nonvolatile memory unit that stores instructions and data even when the electronic system 1000 is off. One or more implementations of the subject disclosure use a mass-storage device (such as a magnetic or optical disk and its corresponding disk drive) as the permanent storage device 1002.

Other implementations use a removable storage device (such as a floppy disk or a flash drive, and its corresponding disk drive) as the permanent storage device 1002. Like the permanent storage device 1002, the system memory 1004 is a read-and-write memory device. However, unlike the permanent storage device 1002, the system memory 1004 is a volatile read-and-write memory, such as random-access memory (RAM). System memory 1004 stores any of the instructions and data that the one or more processing units 1012 need at runtime. In one or more implementations, one or more buffers of the subject technology (e.g., 612, 615, 622, 625, and/or 634 of FIG. 6) can be implemented by the system memory 1004. In one or more implementations, the processes of the subject disclosure are stored in the system memory 1004, the permanent storage device 1002, and/or the ROM 1010. From these various memory units, the one or more processing units 1012 retrieve instructions to execute and data to process in order to execute the processes of one or more implementations.

The bus 1008 also connects to the input device interface 1014 and the output device interface 1006. The input device interface 1014 enables a user to communicate information and select commands to the electronic system 1000. Input devices used with the input device interface 1014 include, for example, alphanumeric keyboards and pointing devices (also called "cursor control devices"). The output device interface 1006 enables, for example, the display of images generated by the electronic system 1000. Output devices used with the output device interface 1006 include, for example, printers and display devices, such as a liquid crystal display (LCD), a light-emitting diode (LED) display, an organic light-emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 10, the bus 1008 also couples the electronic system 1000 to one or more networks (not shown) through one or more network interfaces 1016. In this manner, the computer can be a part of one or more network of computers (such as LAN, a wide area network (WAN), an Intranet, or a network of networks, such as the Internet). Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium can also be nontransitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any nonvolatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any nonsemiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or nonexecutable machine code or as instructions in a high-level language that can be compiled to produce executable or nonexecutable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can differ significantly without varying the underlying logic, function, processing, and output.

While the above discussion primarily refers to microprocessor or multicore processors that execute SW, one or more implementations are performed by one or more integrated circuits, such as application-specific integrated circuits (ASICs) or field programmable gate arrays (FPGAs). In one or more implementations, such integrated circuits execute instructions that are stored on the circuits themselves.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A data analytics device of a host, the data analytics device comprising:
    a plurality of monitors;
    an application-monitor manager engine configured to receive configuration files from a cloud server and to generate monitoring rules for the plurality of monitors based on the received configuration files and to enforce the monitoring rules; and
    a data-processing engine coupled to the application-monitor manager engine and the plurality of monitors and configured to coordinate activities of the plurality of monitors,
    wherein:
        the plurality of monitors are embedded in a user space and a kernel of a host operating system of the host,
        the application-monitor manager engine is further configured to receive data collected from the plurality of monitors and package the collected data for transmission to a cloud-based analytics portal for analysis,
        the plurality of monitors comprise a video engine monitor and a security engine monitor,
        in response to receiving video segments, the data-processing engine is configured to collect statistics of a first segment of the video segments, to trigger the video engine monitor and the security engine monitor, and to collect statistics of a last segment of the video segments, and
        in response to collecting the statistics of the last segment of the video segments, the data-processing engine is configured to build a data package based on data collected by the device and provide the built data package to the cloud server to enable the cloud server to aggregate data for use by multiple network applications.

2. The data analytics device of claim 1, wherein:
    the plurality of monitors are further embedded in the video engine monitor and the security engine of the host,
        the video engine monitor is configured to monitor video content analytics data, and
        the security engine monitor is configured to monitor security analytics data.

3. The data analytics device of claim 2, wherein:
    the video content analytics data comprises a manifest file, a video content source, a video segment identification and video segment statistics, and
    the security analytics data comprises traffic pattern information, digital rights management (DRM) attributes and encryption- and/or authentication-key information.

4. The data analytics device of claim 1, wherein the data-processing engine is further configured to collect data from the plurality of monitors, to preprocess the collected data and to detect relevant events.

5. The data analytics device of claim 4, wherein the relevant events comprise a start and a completion of an active application or a background application, a domain-name system (DNS) query or a video streaming session.

6. The data analytics device of claim 4, further comprising plugins configured to provide a secure data package by securely packaging the collected data and the preprocessed collected data received from the data-processing engine.

7. The data analytics device of claim 6, wherein the secure data package is provided to a cloud-based processor to perform a data analysis including analyzing internet protocol (IP) sessions, video and security events and dynamic analytic data and to perform deep packet inspection (DPI) and correlation in timeline and traffic patterns.

8. The data analytics device of claim 1, wherein the data-processing engine is configured to coordinate the activities of the plurality of monitors by triggering a monitoring of hypertext-transfer protocol (HTTP) messages with a resolved IP address upon completion of a DNS query.

9. The data analytics device of claim 1, wherein:
    the monitoring rules for the plurality of monitors include rules that identify at least one monitor to take action on one or more applications, and
    the plurality of monitors are configured to perform IP stack monitoring by extracting information from a DNS server, a manifest file and video segments requests.

* * * * *